Nov. 18, 1924.
P. H. RYLANDER
GRADER OR SORTER FOR NUTS
Filed Feb. 21, 1924
1,515,757
3 Sheets-Sheet 2
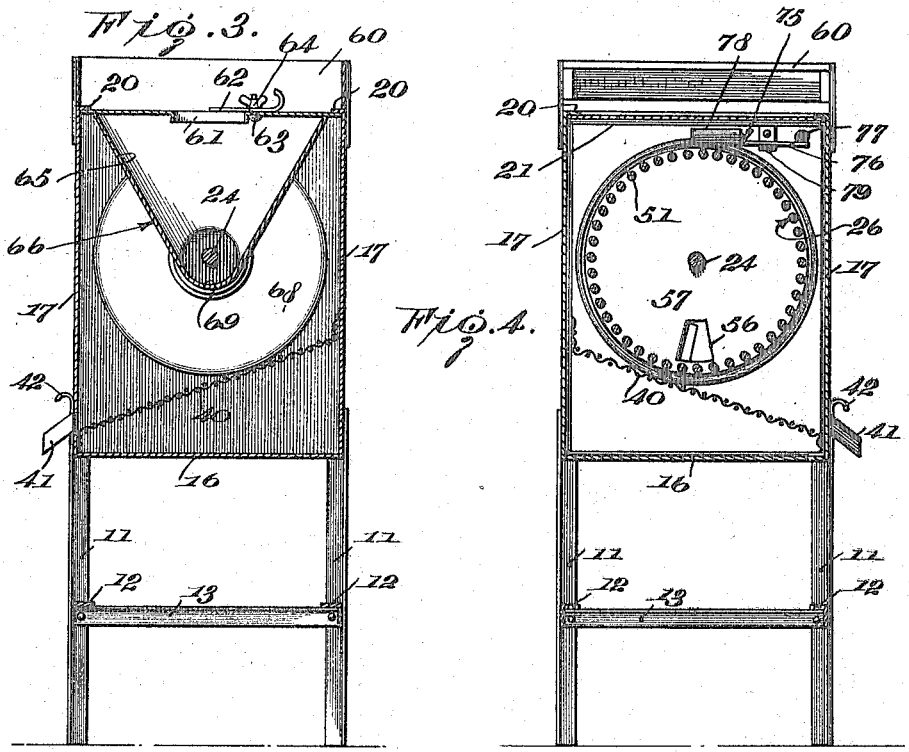
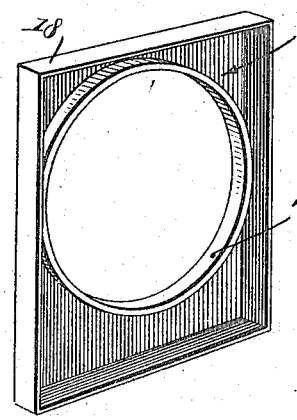
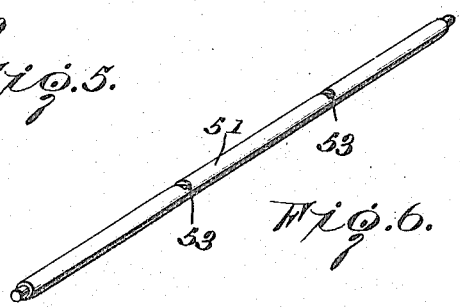
WITNESSES
M. Fowles
INVENTOR
Parrish H. Rylander
BY
ATTORNEYS Nov. 18, 1924. 1,515,757
P. H. RYLANDER
GRADER OR SORTER FOR NUTS
Filed Feb. 21, 1924 3 Sheets-Sheet 3
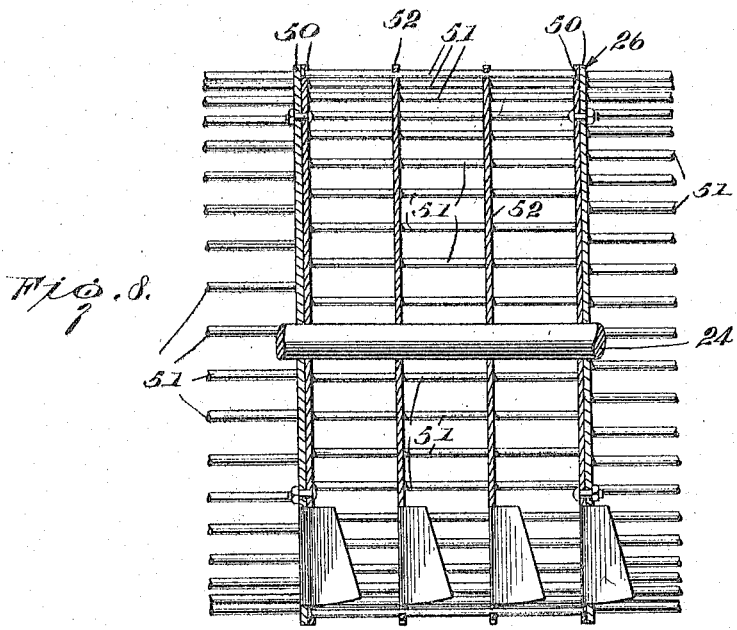
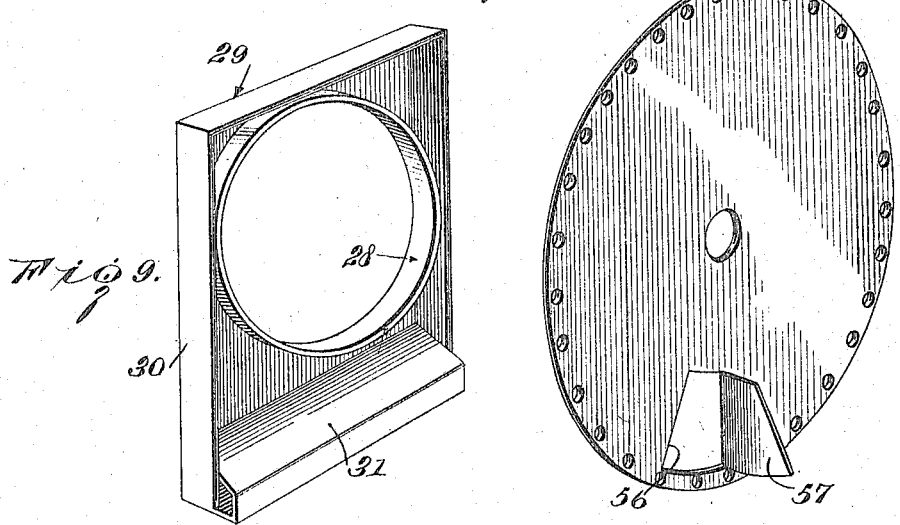
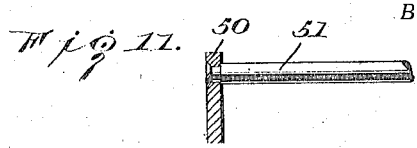
INVENTOR
Parrish H. Rylander
BY
ATTORNEYS Patented Nov. 18, 1924.

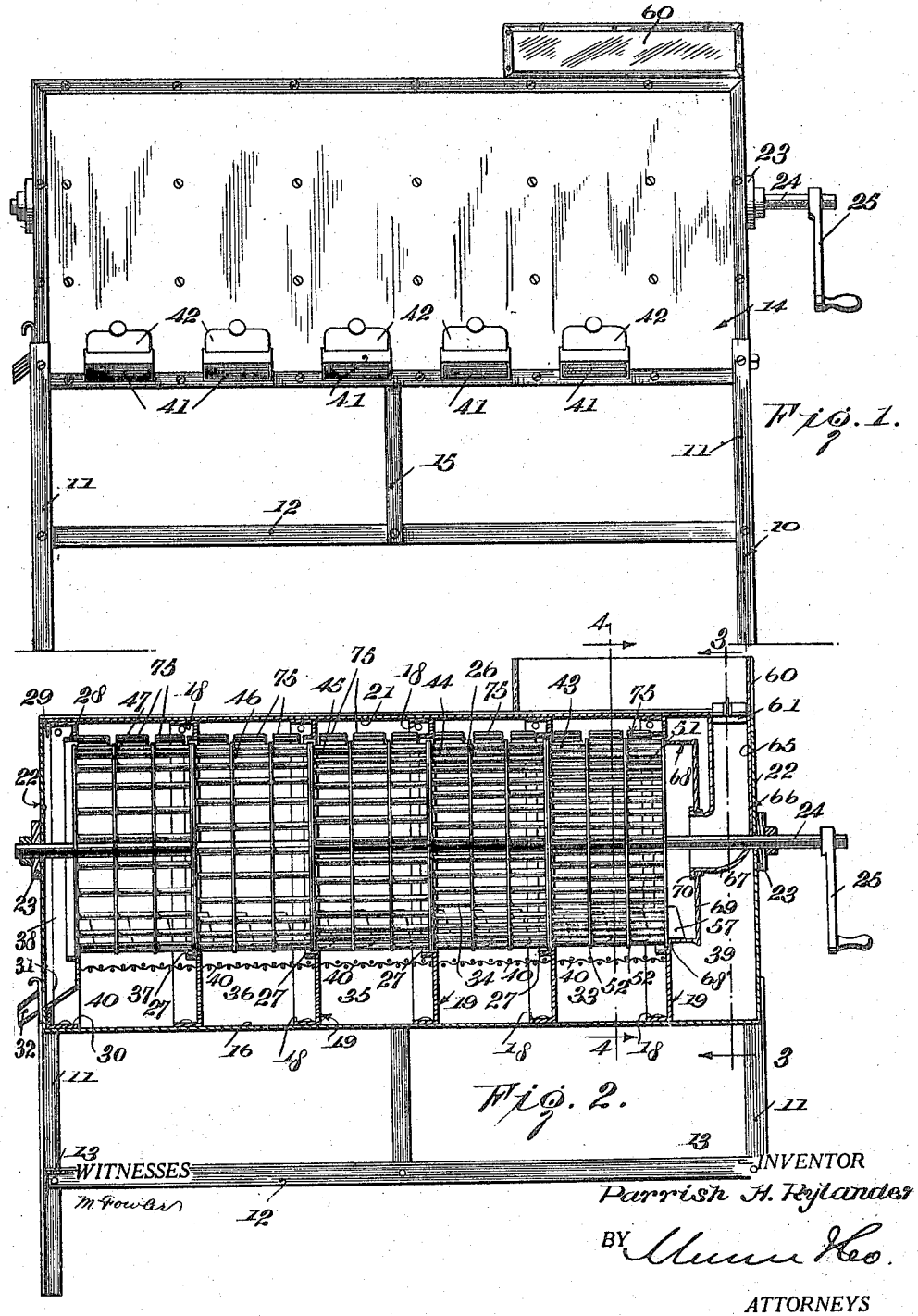

1,515,757

UNITED STATES PATENT OFFICE.

PARRISH HENDRICKS RYLANDER, OF AUSTIN, TEXAS.

GRADER OR SORTER FOR NUTS.

Application filed February 21, 1924. Serial No. 694,356.

*To all whom it may concern:*

Be it known that I, PARRISH HENDRICKS RYLANDER, a citizen of the United States, and a resident of Austin, in the county of Travis and State of Texas, have invented certain new and useful Improvements in Graders or Sorters for Nuts, of which the following is a specification.

This invention relates to a grader or sorter for nuts and is especially, although not necessarily, designed for grading pecans.

The object of the invention is to provide a grader or sorter of this character which automatically segregates the nuts into groups corresponding to the established grades and which is of simple and durable construction, reliable and effective in action and easy and comparatively inexpensive to manufacture so as to be adapted for use by small growers and thereby enable the small growers to take advantage of the better prices obtainable for the high grade nuts.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a view in side elevation, showing one embodiment of the invention;

Figure 2 is a view thereof in longitudinal vertical section;

Figure 3 is a view in transverse vertical section on line 3—3 of Figure 2;

Figure 4 is a view similar to Figure 3 on line 4—4 of Figure 2;

Figure 5 is a detail perspective view of one of the partition or framing members of the main casing;

Figure 6 is a similar view of one of the bars of the cylinder;

Figure 7 is a fragmentary view, partly in section and partly in elevation, showing the manner of securing the partitions of the cylinder to the longitudinal bars;

Figure 8 is an enlarged fragmentary view in section of one of the units of the cylinder;

Figure 9 is a detail perspective view of the frame member at the discharge end of the main casing;

Figure 10 is a detail perspective view of one of the heads of a unit; and

Figure 11 is a fragmentary detail view, partly in section and partly in elevation, showing the connection of the longitudinal bars to the heads.

Referring to the drawings wherein for the sake of illustration is shown one embodiment of the invention, the numeral 10 designates generally a base which may consist of legs 11 and longitudinal and transverse braces designated at 12 and 13 respectively. Preferably the legs 11 and braces 12 and 13 are constructed of angle iron and are bolted, riveted or otherwise suitably secured together.

A main casing or housing, designated generally at 14 is supported upon the legs 11. If found desirable supporting bars 15 may also be employed for supporting the intermediate portions of the casing 14 on the longitudinal braces 12 of the base. It is to be understood that the casing 14 is suitably fastened to the upper ends of the legs 12 as well as to the upper ends of the supporting bars 15 and of course the lower ends of the supporting bars 15 are fastened to the brace bars 12.

The main casing 14 comprises a bottom wall 16, side walls 17 riveted or otherwise suitably secured to the peripheral flanges 18 of frame members or partitions 19. In the embodiment shown, five frame members 19 are provided and are arranged at spaced intervals along the main casing. The upper edges of the side walls 17 are formed with inturned flanges 20 which are slightly spaced above the upper portions of the peripheral flanges 18 of the frame members 19. A top plate 21 is slidably fitted in between the flanges 20 and the upper portions of the peripheral flanges 18 of the frame members 19 and may be removed partially or entirely in order to gain access to the interior of the housing. The housing 14 is completed by end walls 22.

Bearings 23 are provided in the end walls 22 and rotatably receive a shaft 24 which extends longitudinally through the casing 14 and which is fitted at one end with a crank handle 25 or with other means for rotating the shaft 24. This shaft 24 carries a cylinder, designated generally at 26 which will be hereinafter more fully described. This cylinder 26 extends through flanged openings 27 provided in each of the frame members 19 and also through a flanged opening 28 provided in a frame member 29 located at one end of the housing 14. The frame member 29 has a peripheral flange 30 riveted or otherwise suitably secured to the bottom wall 16 and side walls 17 of the casing 14 but this frame member 29 differs from the frame members 19 in that its lower portion is provided with a slideway 31 leading to a delivery chute 32. The frame members 19 and the frame member 29 define within the casing a series of compartments, designated at 33, 34, 35, 36, 37 and 38, respectively, there being one compartment for each of the established grades of nuts. One of the frame members 19 and one of the end walls 22 also define a compartment 39 which however is utilized to accommodate certain parts of the feeding mechanism for supplying the mixture of nuts to the cylinder 26. Each of the compartments 33, 34, 35, 36 and 37 has an inclined screen 40 therein which delivers the nuts falling thereon to a discharge chute 41. The communication of each discharge chute 41 with its compartment is controlled by means of a vertical slidable gate 42.

The cylinder 26 is made up of five units, designated at 43, 44, 45, 46 and 47, respectively. These units are of identical construction, except as to the spacing of the longitudinal bars thereof, and therefore a single description will apply to the major features of each.

Each of the units comprises a pair of heads 50 consisting of circular plates of metal. A plurality of longitudinal bars 51 extend between the heads 50 and have their ends secured to these heads, as shown in Figure 11. The bars 51 are arranged in circumferential series around the outer peripheries of the heads and are spaced circumferentially from each other. The spacing of the bars of each unit differs slightly and preferably the spacing of the bars of the units increases progressively toward the left as the machine is viewed in Figures 1 and 2. Partitions or circular plates 52 are mounted on the bars 51 and preferably two such partitions are provided in each unit and are spaced at regular intervals along the bars. As shown in Figures 6 and 7 each bar 51 is provided with a slot 53 and of course the partitions 52 have openings 54 accommodating the bars 51. The partitions 52 are of metal which has such degree of resilience that portions of the plates 52 may be bent into the slots 53 as indicated at 55 in Figure 7 whereby the plates are locked on the bars 51.

The heads 50 and the plates or partitions 52 are formed with longitudinally alined openings 56 admitting of the passage of the nuts through the cylinder 26. Adjacent each opening 56 a deflecting wing 57 is arranged and is so angularly disposed as to tend to deflect or urge the nuts through the adjacent opening 56. Preferably the openings 56 and the wings 57 are formed by stamping or punching a portion of the metal of the head 50 or partition 52 as the case may be from the body of the same and bending the punched or stamped portion to dispose the wing thus formed in the proper angular relation with respect to the main portion of the plate.

Means is provided for supplying the mixed nuts to the cylinder 26, and this means may comprise a hopper 60 mounted on the casing 14 and having an outlet opening 61 therein controlled by a sliding gate 62 which is held in set position by a bolt 63 and wing nut 64. The bolt 63 extends through the bolt hole provided therefor in the bottom of the hopper 60 and through an elongated slot in the gate 62. The wing nut 64 is threaded on the shank of the bolt 63 and engages the gate 62. By adjusting the gate 62 the feed of the mixed nuts may be controlled. The vertical section 65 of a feed conduit, designated generally at 66 is arranged below the outlet 61 of the hopper 60. The horizontal arm 67 of the feed conduit is fitted loosely to an annular feed chamber 68 having a flanged end 68' riveted or otherwise suitably secured to the adjacent head 50 of the unit 43. The annular body portion of the feed chamber 68 is open at one end to the unit 43 of the cylinder 46 but is closed at its opposite end, by an annular plate 69. The horizontal arm 67 of the feed conduit 66 is loosely fitted in the opening in the annular end plate 69 and may be flanged, as at 70 to prevent endwise displacement.

In operation the nuts in the hopper 60 are fed through the conduit 66 into the feed chamber 68 from whence they pass into the first compartment of the unit 43. In the unit 43 the smallest grade of nuts is separated from the mixture since these smallest nuts fall through the openings in the spaced bars 51 and slide down the screen 40 into the chute 41. There are three compartments in the unit 43 as in the other units 45, 46 and 47 and this insures a complete separation of the smallest grade of nuts for the longitudinal passage of the nuts through the unit 43 is retarded to such an extent as to insure thorough grading by the action of the partitions 52. Eventually however the mixture of nuts is fed from the unit 43 to the unit 44 by the action of the deflecting wings 57 which urge the nuts through the openings 56 in the heads and in the partitions. The rotation of the cylinders 26 tends to cause the nuts to take an angling course through each of the compartments of each of the units and thus by disposing the openings 16 in line a too rapid passage of the nuts through the compartments of any unit is prevented. In the unit 44 the next to the smallest size of nuts is segregated and a similar action occurs in the units 45, 46 and 47 in respect of the successively greater size of nuts. The largest or jumbo nuts pass through the unit 47 into the compartment 38 wherein they are fed by the deflecting portion 31 into the chute 32.

It sometimes happens that a nut which is perhaps just slightly in excess of the size adapted to pass between the bars 51 of the unit 43 will become wedged in the bars and have a portion projecting therefrom. This of course is also true of the other units 45, 46 and 47. In order to displace such wedged nuts from between the bars of the units pivoted knockers 75 are provided. As shown in the drawings one such knocker 75 is provided for each compartment of each unit. Each knocker comprises an arm 76 pivotally mounted, as at 77 on the frame members, and having a weighted knocker portion 78 disposed slightly above the uppermost portion of the compartment of the unit with which it coacts. A rest or stop bar 79 is provided for the knockers of each unit, the bars 79 being secured to adjacent frame members 19 and limiting the downward swinging movement of the knockers 75 although leaving these knockers free to move upwardly. By virtue of the provision of the knockers the full grade area of the compartment of each unit is available at all times.

I claim:

1. A grader including a casing, a rotatable cylinder in the casing, said cylinder including a series of grading units, each grading unit comprising a pair of heads and a plurality of partitions defining a plurality of compartments in each unit, the partitions retarding the passage of nuts through the units, each partition and each head having an opening through which the gradual passage of the nuts through the compartments of each unit and from unit to unit is permitted, and a series of spaced bars extending lengthwise of the heads and partitions, the spacing of the bars being varied in the different units.

2. A grader including a casing, a rotatable cylinder in the casing, said cylinder including a series of grading units, each grading unit comprising a pair of heads and a plurality of partitions defining a plurality of compartments in each unit, the partitions retarding the passage of nuts through the units, each partition and each head having an opening through which the gradual passage of the nuts through the compartments of each unit and from unit to unit is permitted, and a series of spaced bars extending lengthwise of the heads and partitions, the spacing of the bars being varied in the different units, each of said partitions and each of said heads having a winged deflector adjacent its opening.

3. A grader comprising a cylinder made up of a series of grading units, each of said grading units including spaced bars, means for clearing the spaces between the bars, said means including pivoted knockers cooperatively disposed with respect to the bars of each unit, the free end of the knockers being weighted, and means for limiting the movement of the knockers toward the grading units.

4. A grader comprising a rotatable cylinder having heads, spaced longitudinal bars extending between the heads and secured thereto, said bars being arranged in circumferential series around said heads, partitions having openings receiving said rods, said rods having slots, and said partitions having portions engaged in the slots of said rods.

5. A grader comprising a main casing having a removable top, a longitudinal shaft journaled in said casing, a cylinder fixed on said shaft and comprising a series of grading units, each of said grading units including a pair of heads, a pair of partitions, and a circumferential series of spaced bars secured to the heads and to the partitions, spaced framing members arranged in the main casing and defining a separate compartment for each unit of the cylinder, feeding mechanism for the cylinder including a hopper having a gate controlled outlet, a feed conduit having a vertical section connected to the outlet of the hopper and having a horizontal section, and a feed chamber connected to the cylinder and having an opening in which the horizontal section of the feed conduit is loosely fitted.

PARRISH HENDRICKS RYLANDER.